(12) United States Patent
Tsukio et al.

(10) Patent No.: US 7,885,621 B2
(45) Date of Patent: Feb. 8, 2011

(54) RECEIVER AND ELECTRONIC APPARATUS USING THE SAME

(75) Inventors: Yasunobu Tsukio, Osaka (JP); Hiroaki Ozeki, Osaka (JP); Yosuke Wada, Osaka (JP)

(73) Assignee: Panasonic Corporation, Osaka (JP)

( * ) Notice: Subject to any disclaimer, the term of this patent is extended or adjusted under 35 U.S.C. 154(b) by 42 days.

(21) Appl. No.: 12/293,376

(22) PCT Filed: Dec. 4, 2007

(86) PCT No.: PCT/JP2007/073373

§ 371 (c)(1),
(2), (4) Date: Sep. 17, 2008

(87) PCT Pub. No.: WO2008/087804

PCT Pub. Date: Jul. 24, 2008

(65) Prior Publication Data

US 2009/0325519 A1    Dec. 31, 2009

(30) Foreign Application Priority Data

Jan. 15, 2007    (JP) .............................. 2007-005617

(51) Int. Cl.
H04B 17/02    (2006.01)
(52) U.S. Cl. ...................................... 455/137; 375/347
(58) Field of Classification Search .................. 455/101, 455/135, 136, 137, 138, 277.1, 550.1, 562.1, 455/575.7; 375/267, 347
See application file for complete search history.

(56) References Cited

U.S. PATENT DOCUMENTS 7,107,085 B2* 9/2006 Doi ............................ 455/101
7,636,593 B2* 12/2009 Kurioka ...................... 455/137
2005/0101271 A1* 5/2005 Ahn et al. .................... 455/137

FOREIGN PATENT DOCUMENTS

| JP | 03-280625 A | 12/1991 |
|----|-------------|---------|
| JP | 05-110464 A | 4/1993  |

(Continued)

OTHER PUBLICATIONS

International Search Report for PCT/JP2007/073373 dated Jan. 22, 2008.

*Primary Examiner*—Thanh C Le
(74) *Attorney, Agent, or Firm*—RatnerPrestia

(57) ABSTRACT

A receiver according to the present invention includes a first receiving (RCV) quality detector and a second RCV quality detector connected before a combining unit. The second RCV quality detector determines a quality of a signal output from at least one of a first receiving unit and a second receiving unit by a method different from that of the first RCV quality detector. A controller allows the receiver to operate in a single receiving mode when a determination result of the second RCV quality detector is not better than a predetermined level regardless of a determination result of a determination result of the first RCV quality detector not being a predetermined level. When the receiver passes in an area where the receiver cannot receive a broadcast signal, the determination result of the second RCV quality detector is not better than the predetermined level. In response, the controller allows the receiver to operate in the single receiving mode, thereby reducing power consumption of the receiver.

9 Claims, 5 Drawing Sheets

FOREIGN PATENT DOCUMENTS

| | | |
|---|---|---|
| JP | 2000-022610 A | 1/2000 |
| JP | 2000-138654 A | 5/2000 |
| JP | 2004-147119 A | 5/2004 |
| JP | 2004-297281 A | 10/2004 |
| JP | 2004-320528 A | 11/2004 |
| JP | 2006-066959 A | 3/2006 |
| JP | 2006-311258 A | 11/2006 |
| JP | 2007-005617 | 10/2007 |
| WO | WO 2005/002111 A2 | 1/2005 |

\* cited by examiner

RECEIVER AND ELECTRONIC APPARATUS USING THE SAME

This application is a U.S. National Phase Application of PCT International Application PCT/JP2007/073373.

TECHNICAL FIELD

The present invention relates to a receiver for receiving signals and an electronic apparatus including the receiver.

BACKGROUND ART

A conventional receiver will be described referring to FIG. 5. In FIG. 5, the conventional receiver 1 is, for example, a television tuner installed in a portable telephone. The conventional receiver 1 includes a first signal receiving unit 2 and a second signal receiving unit 3 which receive signals from a single signal source, a combining unit 4 for combining respective signals output from the first receiving unit 2 and the second receiving unit 3, and an error corrector 5 for correcting errors in a signal output from the combining unit 4.

The convention receiver 1 further includes a receiving (RCV) quality detector 6 and a controller 7. The RCV quality detector 6 determines a quality of the received signal based on a BER (bit error rate) supplied from the error corrector 5. The controller 7 switches between a single receiving mode and a diversity receiving mode. Either the first receiving unit 2 or the second receiving unit 3 receives a signal in the single receiving mode when the determination result of the RCV quality detector 6 is better than a predetermined level. Both the first receiving unit 2 and the second receiving unit 3 receive the signal in the diversity receiving mode when the determination result of the RCV quality detector 6 is not better than the predetermined level.

A prior art related to the present invention is described in Patent Document 1.

When the conventional receiver 1 passes through an area where a broadcast signal does not exist or has a sensitivity level lower than a sensitivity level for receiving the signal in the diversity receiving mode, the determination result of the RCV quality detector 6 is not better than the predetermined level. The controller 7 consequently causing the receiver 1 to operate in the diversity receiving mode which increases power consumption of the first receiving unit 2 and the second receiving unit 3. That is, the conventional receiver 1 increases overall power consumption even in the area where the receiver 1 cannot receive broadcast signals.

Patent Document 1: Japanese Patent Laid-Open Publication No. 2006-311258.

SUMMARY OF THE INVENTION

A receiver according to the present invention includes a first receiving (RCV) quality detector and a second RCV quality detector connected before a combining unit. The second RCV quality detector determines a quality of a signal output from at least one of a first receiving unit and a second receiving unit by a method different from that of the first RCV quality detector. When the receiver passes through an area where the receiver cannot receive a broadcast signal, the determination result of the second RCV quality detector is not better than the predetermined level. In response, the controller allows the receiver to operate in the single receiving mode. This operation reduces power consumption of the receiver in the area where the receiver cannot receive a broadcast signal.

Figure 1:
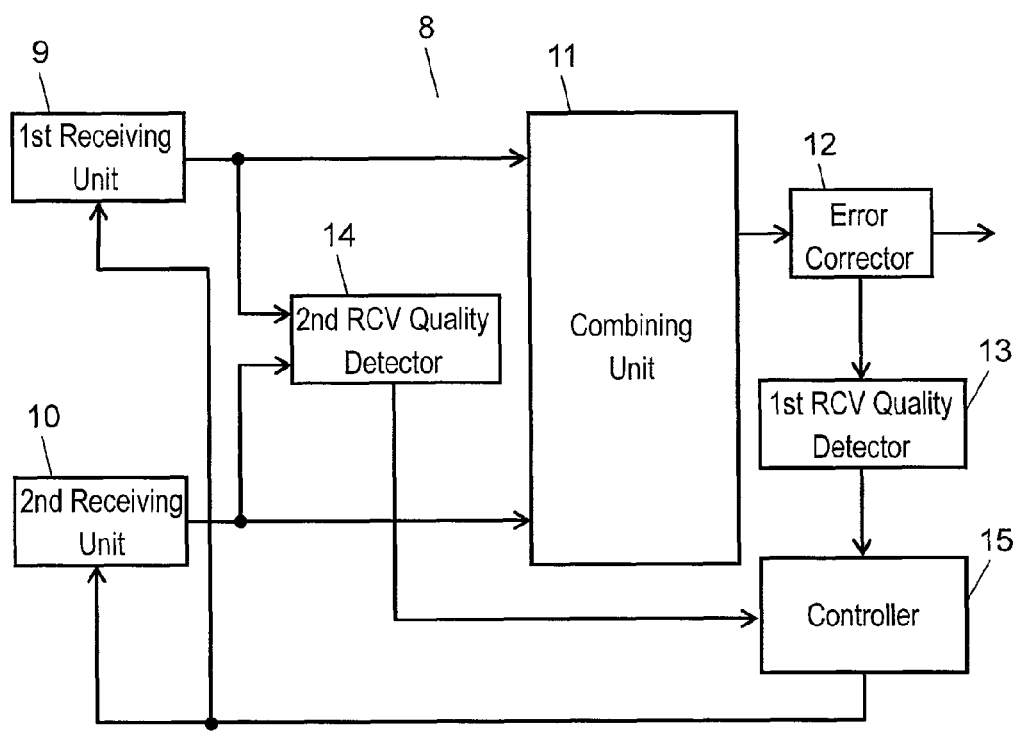
FIG. 1 is a block diagram of a receiver according to Exemplary Embodiment 1 of the present invention.

REFERENCE NUMERALS 8, 16, 19, 21 Receiver
9 First Receiving Unit
10 Second Receiving Unit
11 Combining Unit
12 Error Corrector
13 First Receiving Quality Detector
14 Second Receiving Quality Detector
15 Controller
17 Receiving Unit
20 Time Counter

DETAIL DESCRIPTION OF THE PREFERRED EMBODIMENTS

Exemplary Embodiment 1

Exemplary Embodiment 1 of the present invention will be described referring to FIG. 1. FIG. 1 is a block diagram of a receiver according to Embodiment 1. In FIG. 1, a receiver 8 is, for example, a television tuner installed in a portable terminal. The receiver 8 includes a first receiving unit 9 and a second receiving unit 10 which are connected to antennas (not shown), a combining unit 11 for combining respective signals output from the first receiving unit 9 and the second receiving unit 10, and an error corrector 12 for correcting errors in a signal output from the combining unit 11. A portable terminal or electronic apparatus (not shown) includes the receiver 8, a decoder (not shown) for decoding a signal output from the error corrector 12, and a display (not shown), such as a liquid crystal display, for displaying a signal output from the decoder.

The receiver 8 further includes a first receiving (RCV) quality detector 13 for determining a receiving quality based on an error rate, i.e., a BER (bit error rate) determined by the error corrector 12 and a second RCV quality detector 14 connected before the combining unit 11. The second RCV quality detector determines whether at least one of the signals output from the first receiving unit 9 and the second receiving unit 10 contains a synchronizing signal or not. The synchronizing signal may be a frame synchronizing signal carrying a synchronizing word contained in a frame, a TMCC (transmission and multiplexing configuration control) synchronizing signal representing a mode for acquiring TMCC data or transmission parameters, or an AFC synchronizing signal representing a mode for frequency synchronization on the receiver.

The receiver 8 further includes a controller 15 for switching between a single receiving mode and a diversity receiving mode. In the single receiving mode, either the first receiving unit 9 or the second receiving unit 10 receives a signal. In the diversity receiving mode, both the first receiving unit 9 and the second receiving unit 10 receive the signal. The controller 15 switches the receiver 8 to the single receiving mode when the determination result of the first RCV quality detector 13 becomes better than a predetermined level A while the receiver 8 operates in the diversity receiving mode, that is, when the BER output from the error corrector 12 becomes not less than a predetermined level a while the receiver 8 operates in the diversity receiving mode. The controller 15 switches the receiver 8 to the diversity receiving mode when the determination result of the first RCV quality detector 13 is not better than a reference level B while the receiver 8 operates in the single receiving mode, that is, when the BER output from the error corrector 12 becomes greater than a reference level b. The reference level A is better than the reference level B.

Regardless of the determination result of the first RCV quality detector 13 not being better than the predetermined level B, the controller 15 allows the receiver 8 to operate in the single receiving mode when the determination result of the second RCV quality detector 14 is not better than the predetermined level, that is, when the second RCV quality detector 14 determines that the received signal does not contain a synchronizing signal. The synchronizing signal is transmitted generally by a modulating method which has larger resistance to noise than a modulating method by which a data signal, such as video data, is transmitted. Therefore, the sensitivity for receiving the synchronizing signal in the single receiving mode is higher than the sensitivity for receiving the data signal in the diversity receiving mode. The receiver 8 monitors whether or not the synchronizing signal is contained in the single receiving mode. This monitoring allows the receiver 8 to start receiving a signal in the diversity receiving mode upon entering again the area where the receiver 8 can receive the broadcast signal.

The single receiving mode is a power-saving mode in which one of the first receiving unit 9 and the second receiving unit 10 is disconnect from a power supply, and an operation of the combining unit for combining the signals requires a smaller electric power. The single receiving mode thus allows the receiver 8 to operate with less power consumption than the diversity receiving mode.

In the above arrangement, when the receiver passes through the area where the receiver 8 does not receive the broadcast signal, the second RCV quality detector 14 determines that the signal quality is not better than the predetermined level or that the received signal does not contain a synchronizing signal. Then, the controller 15 allows the receiver 8 to operate in the single receiving mode having lower power consumption. Thus, the receiver 8 has low power consumption at the area where the receiver 8 does not receive a broadcast signal.

The first RCV quality detector 13 may determine the quality of the received signal from a factor, such as a CN (carrier to noise) ratio, other than the error rate. The second RCV quality detector 14 may be connected only after the first receiving unit or only after the second receiving unit. The second RCV quality detector may be connected after at least one of the receiving units which outputs a signal.

The second RCV quality detector 14 is connected preferably before the combining unit 11, as shown in FIG. 1.

A reason for the above connection will be explained below. A relationship between sensitivity to the synchronizing signal and sensitivity to a received signal of the receiver 8 is shown below.

(Sensitivity to the synchronizing signal in the diversity receiving mode)>(sensitivity to the synchronizing signal in the single receiving mode)>(sensitivity to the received signal in the diversity receiving mode)>(sensitivity to the received signal in the single receiving mode)

In the case that the second RCV quality detector 14 is connected after the combining unit 11, the second RCV quality detector 14 determines whether or not the combined signal output from the combining unit 11 contains the synchronizing signal. When the receiver 8 operates in the diversity receiving mode, the second RCV quality detector 14 determines whether or not the synchronizing signal exists at the synchronizing sensitivity in the diversity receiving mode. This causes the problem that the receiver 8 is not switched from the diversity receiving mode to the single receiving mode unless a receiving quality declines to a level equal to the sensitivity to the synchronizing signal in the diversity receiving mode. The second RCV quality detector 14 connected before the combining unit 11 determines, prior to the combining of the signals, whether or not the received signal contains the synchronizing signal. Thus, the second RCV quality detector 14 determines whether or not the synchronizing signal is contained at the sensitivity to the synchronizing signal in the single receiving mode. While the receiver 8 operates in the diversity receiving mode, the controller 15 switches the receiver 8 from the diversity receiving mode to the single receiving mode when the receiving quality declines to a level equal to the sensitivity to the synchronizing signal in the single receiving mode. That is, if the receiver cannot receive data in the diversity receiving mode, the second RCV quality detector 14 connected before the combining unit 11 allows the receiver to switch more rapidly from the diversity receiving mode to the signal receiving mode than the detector connected after the combining unit, thus reducing power consumption of the receiver 8.

The first RCV quality detector 13 may determine the quality of the received signal based on the C/N ratio or an AGC (automatic gain control) level. The sensitivity to the received signal varies according to a modulation method of the signal. In the case that the quality is determined based on the C/N ratio or the AGC level, the controller may determine the modulation method of the signal and change a threshold for the second RCV quality detector 14, thereby controlling the receiver accurately.

When the determination of the second RCV quality detector 14 is not better than the predetermined level, the controller 15 may turn off components connected after the second RCV quality detector 14 excluding the controller 15 and a decoder or a display connected to an output port of the receiver 8, or may reduce power consumption of the components, the decoder, or the display. Thereby, the receiver 8 can significantly decrease the power consumption of the electronic apparatus installing the receiver when moving in the area where the broadcast signal cannot be received.

Exemplary Embodiment 2

Figure 2:
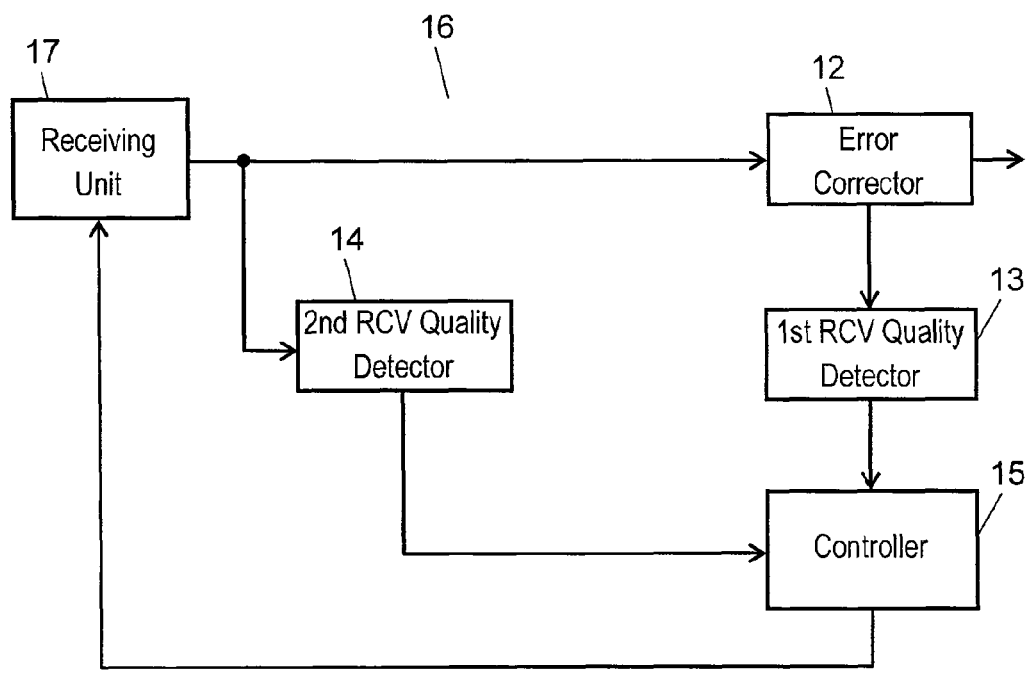
FIG. 2 is a block diagram of a receiver according to Exemplary Embodiment 2 of the invention.

Exemplary Embodiment 2 of the present invention will be described below referring to FIG. 2. FIG. 2 is a block diagram of a receiver according to Embodiment 2. Unless otherwise described, components of Embodiment 2 identical to those of Embodiment 1 are denoted by the same reference numerals.

As shown in FIG. 2, the receiver 16 includes a receiving unit 17 instead of the first receiving unit 9 and the second receiving unit 10. The receiving unit 17 operates in a first receiving mode for receiving a signal at a first receiving sensitivity, and in a second receiving mode for receiving the signal at a second receiving sensitivity which is higher than the first receiving sensitivity. For example, the first receiving mode is a power-saving mode in which the gain of an amplifier (not shown) installed in the receiving unit 17 is lower than a normal gain while the second receiving mode is a normal mode in which the gain of the amplifier is higher than that in the power-saving mode. The smaller gain reduces power consumption of the amplifier.

The receiver 16, similarly to Embodiment 1, includes an error corrector 12, a first receiving (RCV) quality detector 13, and a second RCV quality detector 14. The error corrector 12 corrects errors in the signal output from the receiving unit 17. The first receiving (RCV) quality detector 13 determines a quality of the received signal based on an error rate, i.e., a BER level determined by the error corrector 12. The second RCV quality detector 14 is connected between the receiving unit 17 and the first RCV quality detector 13, and determines whether or not the signal output from the receiving unit 17 contains a synchronizing signal.

When the determination result of the first RCV quality detector 13 becomes better than a predetermined level A, a controller 15 switches an operation of the receiving unit 17 from the second receiving mode to the first receiving mode. When the determination result of the first RCV quality detector 13 becomes not better than a predetermined level B, the controller 15 switches the operation of the receiving unit 17 from the first receiving mode to the second receiving mode. The predetermined level A is better than the predetermined level B.

When the determination result of the second RCV quality detector 14 is not better than the predetermined level, that is, when the second RCV quality detector 14 determines that the received signal does not contain a synchronizing signal, the controller 15 switches the operation of the receiving unit 17 to the first receiving mode regardless of the determination result of the first RCV quality detector 13 not being better than the predetermined level B.

This operation causes the controller 15 to judge that the determination result of the second RCV quality detector 14 is not better than the predetermined level, i.e., that the received signal does not contain a synchronizing signal when the receiver 16 passes in an area where the receiver 16 cannot receive broadcast signals, and to allow the receiver 16 to operate in the first receiving mode with less power consumption. Thus, the receiver 16 can reduce the power consumption in the area where the broadcast signal cannot be received.

The second RCV quality detector 14 may determine a C/N ratio of the signal output from the receiving unit 17 instead of determining whether or not the signal output from the receiving unit 17 contains a synchronizing signal, providing the same effects.

Exemplary Embodiment 3

Figure 3:
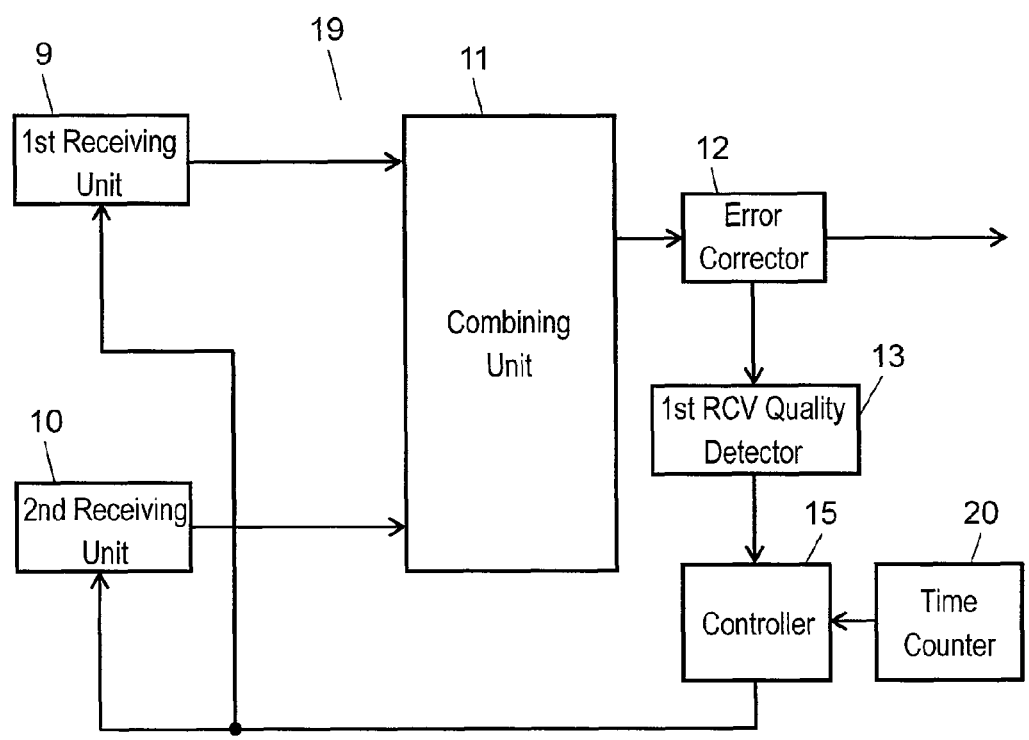
FIG. 3 is a block diagram of a receiver according to Exemplary Embodiment 3 of the invention.

Exemplary Embodiment 3 of the present invention will be described below referring to FIG. 3. FIG. 3 is a block diagram of a receiver according to Embodiment 3. Unless otherwise described, components of Embodiment 3 identical to those of Embodiment 1 are denoted by the same reference numerals.

A receiver 19 includes a time counter 20 connected to a controller 15. When the time counted by the time counter 20 indicates that a predetermined time lapses after causing both the first receiving unit 9 and the second receiving unit 10 to operate in a diversity receiving mode, the controller 15 switches the operation of both the first receiving unit 9 and the second receiving unit 10 to the single receiving mode regardless of the determination result of the first RCV quality detector 13 not being better than the predetermined level B. The predetermined time may be a constant time, such as thirty seconds. If the diversity receiving mode repetitively continues a lot of times, the predetermined time may be changed into another time, such as sixty seconds.

This operation allows the controller 15 to cause the receiver 19 to operate in the single receiving mode with less power consumption when the receiver 19 passes in an area where the receiver cannot receive broadcast signals for a time longer than the predetermined time. Thus, the receiver 19 can reduce the power consumption in the area where the receiver cannot receive the broadcast signals.

At this moment, the receiver 19 operates in the single receiving mode under the above control, and hence, can hardly detect that the quality of the received signal becomes better when the quality returns back to the quality allowing the signal to be receiver in the diversity receiving mode. In this case, the controller 15 switches the operation of the receiver 19 to the diversity receiving mode when a time longer than the predetermined time lapses from switching to the single receiving mode after the predetermined time. Thereby, controller 15 can easily determine that the quality of the received signal becomes better enough to receive the signal in the diversity mode after switching the operation of the receiver 19 to the single receiving mode.

When a predetermined time lapses after switching the operation of the first receiving unit 9 and the second receiving unit 10 to the diversity receiving mode, the controller may turn off the decoder or the display in an electronic apparatus including the receiver 19 or may reduce their power consumption. This operation reduces power consumption of the electronic apparatus including the receiver 19 when moving into an area where the receiver 19 cannot receive broadcast signals.

Exemplary Embodiment 4

Figure 4:
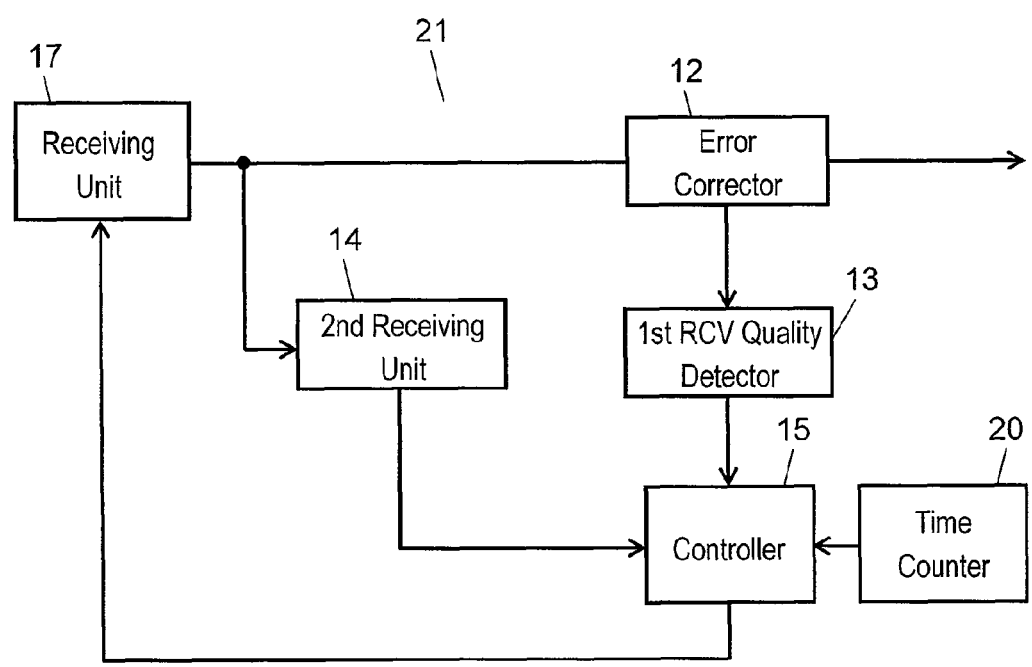
FIG. 4 is a block diagram of a receiver according to Exemplary Embodiment 4 of the invention.
Figure 5:
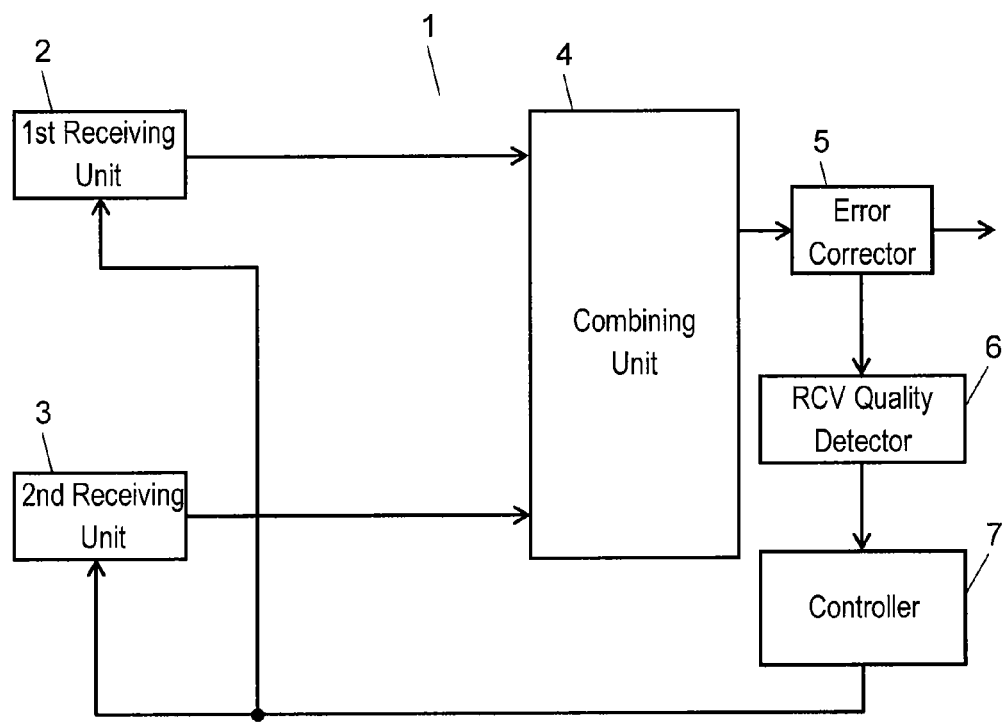
FIG. 5 is a block diagram of a conventional receiver.

Exemplary Embodiment 4 of the present invention will be described below referring to FIG. 4. FIG. 4 is a block diagram of a receiver according to Embodiment 4. Unless otherwise described, components of Embodiment 4 identical to those of Embodiment 2 are denoted by the same reference numerals.

A receiving unit 17 operates in a first receiving mode for receiving a signal at a first receiving sensitivity and in a second receiving mode for receiving the signal at a second receiving sensitivity. When the determination result of the first RCV quality detector 13 becomes better than a predetermined level A, the controller 15 switches the operation of the receiving unit 17 from the second receiving mode to the first receiving mode. When the determination result of the first RCV quality detector 13 becomes not better than a predetermined level B, the controller 15 switches the operation of the receiving unit 17 from the first receiving mode to the second receiving mode. The receiver 21 further includes a time counter 20 connected to the controller 15. When receiving a time counted by the time counter 20 indicates that a predetermined time lapses after switching the operation of the receiving unit 17 to the second receiving mode, the controller 15 switches the operation of the receiving unit 17 to the first receiving mode regardless of the determination result of the first RCV quality detector 13 being not better than the predetermined level B.

When the receiver 21 passes in an area where the receiver cannot receive broadcast signals for a predetermined period of time, the controller 15 switches the operation of the receiver 21 to the first receiving mode with less power consumption. This operation reduces the power consumption of the receiver 21 in the area where the broadcast signals cannot be received.

Since the receiver 21 operates in the single receiving mode under the above control, the receiver 21 can hardly detect the improvement of the quality of the received signal when the quality returns back to a level enough to receive the signal in the second receiving mode. In this case, the controller 15 switches the operation of the receiver 21 back to the second receiving mode when a time longer than the predetermined time lapses from switching the operation to the first receiving mode after the predetermined time lapses. This operation allows the receiver 21 to easily determine that the quality of the received signal is improved to a level enough to receive the signal in the second receiving mode after switching the operation to the first receiving mode.

When a period of time lapses after switching the operation of the receiving unit 17 to the second receiving mode, the receiver 21 may turn off the decoder or the display of the electronic apparatus including the receiver 21, or may reduce their power consumption. This operation significantly reduces the power consumption of the electronic apparatus including the receiver 21 in an area where the receiver 21 cannot receive broadcast signals.

INDUSTRIAL APPLICABILITY

A receiver according to the present invention can reduce power consumption in an area where the receiver cannot receive broadcast signals, and thus being applicable to an electronic apparatus, such as a portable telephone equipped with a television set or a receiver for vehicle.

The invention claimed is:

1. A receiver comprising:
a first receiving unit and a second receiving unit for receiving a signal;
a combining unit for combining signals output from the first receiving unit and the second receiving unit;
a first receiving quality detector for determining a quality of a signal output from the combining unit;
a second receiving quality detector connected before the combining unit, the second receiving quality detector determining whether or not at least one of the signals output from the first receiving unit and the second receiving unit contains a synchronizing signal; and
a controller for, in response to a determination result of the first receiving quality detector, switching between a single receiving mode in which at least one of the first receiving unit and the second receiving unit receives the signal and a diversity receiving mode in which both the first receiving unit and the second receiving unit receive the signal,
wherein the controller is operable to allow the first receiving unit and the second receiving unit to operate in the single receiving mode if the second receiving quality detector determines that the at least one of the signals does not contain the synchronizing signal regardless of the determination result of the first receiving quality detector.

2. The receiver according to claim 1, wherein the first receiving quality detector is operable to determine the quality of the output signal based on an error rate of the output signal.

3. An electronic apparatus comprising:
the receiver according to claim 2;
a decoder connected to an output port of the receiver; and
a display connected to an output port of the decoder.

4. The receiver according to claim 1, wherein the synchronizing signal is at least one of a frame synchronizing signal, a TMCC synchronizing signal, and an AFC synchronizing signal.

5. An electronic apparatus comprising:
the receiver according to claim 4;
a decoder connected to an output port of the receiver; and
a display connected to an output port of the decoder.

6. The receiver according to claim 1, wherein the controller is operable to turn off the combining unit or the first receiving quality detector or to reduce power consumption of the combining unit or the first receiving quality detector if the second receiving quality detector determines that the at least one of the signals does not contain the synchronization signal.

7. An electronic apparatus comprising:
the receiver according to claim 6;
a decoder connected to an output port of the receiver; and
a display connected to an output port of the decoder.

8. The electronic apparatus according to claim 7, wherein the controller is operable to turn off the decoder or the display or to reduce power consumption of the decoder or the display when the second receiving quality detector determines that the at least one the signals does not contain the synchronizing signal.

9. An electronic apparatus comprising:
the receiver according to claim 1;
a decoder connected to an output port of the receiver; and
a display connected to an output port of the decoder.

* * * * *

UNITED STATES PATENT AND TRADEMARK OFFICE
CERTIFICATE OF CORRECTION

| | |
|---|---|
| PATENT NO. | : 7,885,621 B2 |
| APPLICATION NO. | : 12/293376 |
| DATED | : February 8, 2011 |
| INVENTOR(S) | : Yasunobu Tsukio et al. |

It is certified that error appears in the above-identified patent and that said Letters Patent is hereby corrected as shown below:

Cover Page

Item (56), References Cited, OTHER PUBLICATIONS, please enter -- JP Office Action for Application No. JP2007-005617 dated October 17, 2007. --.

Signed and Sealed this
Ninth Day of August, 2011

David J. Kappos
*Director of the United States Patent and Trademark Office*